UNITED STATES PATENT OFFICE.

FIN SPARRE, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

WATERPROOF COMPOSITION FOR EXPLOSIVES.

No. 850,266.  Specification of Letters Patent.  Patented April 16, 1907.

Application filed October 24, 1905. Serial No. 284,152.

*To all whom it may concern:*

Be it known that I, FIN SPARRE, a subject of the King of Norway, residing at Wilmington, county of Newcastle, and State of Delaware, have invented a new and useful Improvement in Waterproof Compositions for Explosives; of which the following is a full, clear, and exact description.

My invention relates to nitrate-of-ammonia explosives—that is, those explosives in which the chief oxygen-carrier is nitrate of ammonia—and has for its object to render the same non-hygroscopic.

The invention consists in a waterproof composition consisting of a liquid nitro compound (in which preferably has been dissolved a solid nitro compound) in which is dissolved guncotton or other nitrated cellulose, this composition when mixed with the nitrate of ammonia coating the particles of the latter and rendering it impervious to moisture.

The invention also consists in the process of making such waterproof composition. The invention is also applicable to other explosives ordinarily possessing hygroscopic properties; but the invention finds its chief field of usefulness in connection with nitrate-of-ammonia explosives.

It has been proposed to manufacture non-hygroscopic nitrate-of-ammonia powder by dissolving a solid body, such as rosin, in a volatile solvent, such as alcohol, then mixing the solution with the ingredients of the powder and then evaporating the solvent. It has also been proposed to add to the powder waterproofing liquids, such as kerosene or nitroglycerin. It has also been proposed to mix nitrate of ammonia or nitrate-of-ammonia powder with solid nitro compounds, such as dinitrobenzol or mononitronaphtalene, and heating the mixture to a temperature at which the compounds will melt and then permitting the powder to cool, thereby producing supposedly a powder whose particles were provided with a waterproof coating. These attempts, however, have not been successful. There has either been no reduction of the hygroscopicity or it has been too slight to be of practical value.

Additions of small amounts of the liquids mentioned produce no appreciable beneficial results. Addition of larger amounts of these liquids not only fails to reduce the hygroscopicity to any practical extent; but it is impracticable to add large amounts, as they exude rapidly and spoil the explosive. Moreover, such liquids are easily washed out by water, and thus are of no practical use so far as waterproof qualities are concerned. So far as nitroglycerin is concerned its addition in large enough quantities to be appreciably efficient to reduce hygroscopicity robs the powder of the very qualities that commend it to use—that is, the powder is no longer fumeless, it freezes at a relatively high temperature, and it is less safe.

The failure of melted solid nitro compounds to act efficiently is doubtless due to the fact that these compounds crystallize, and therefore coat the particles of powder imperfectly and unevenly and are brittle and porous at lower temperatures.

It is essential in order to obtain non-hygroscopicity and waterproofing that the nitrate of ammonia or nitrate-of-ammonia powder should be coated with or absorb a material that is amorphous, viscous, insoluble in water, and waterproof and also combustible, non-freezing, stable, safe, and practically non-volatile at high or low temperature. This material I obtain, as before stated, by dissolving guncotton in a liquid nitro compound in which preferably has previously been dissolved a solid nitro compound. As examples of liquid nitro compounds that may be used may be specified mononitrobenzol and mononitrotoluol. As examples of solid nitro compounds that may be used may be specified dinitrobenzol, dinitrotoluol, and trinitrotoluol. The guncotton used may be nitrocellulose of high or low nitration.

Of the two liquid nitro compounds named mononitrotoluol is preferred on account of being less volatile, having a less strong smell, and capable of dissolving nitrocellulose a little better than mononitrobenzol.

I have found that nitrocellulose is more easily dissolved by liquid mononitro compounds if a normally solid higher nitro compound—say trinitrotoluol—is present in the solution and the solution is less thick, so that more nitrocellulose can be dissolved. Another reason for the employment of a higher nitro compound is that the mixture contains more oxygen than if a mononitro compound only is present.

My preferred waterproof composition is as follows: Mononitrotoluol, eighty per cent.; trinitrotoluol, ten per cent.; guncotton, ten per cent. The liquid nitro compound may, however, vary from sixty per cent. to ninety-five per cent. The solid nitro compound should not exceed twenty-five per cent., as a larger proportion produces crystallization. It may be omitted altogether, but with less completely satisfactory results for the reasons above stated. The guncotton may vary from one per cent. to fifteen per cent. Its addition is essential, as otherwise the solution would be too thin. The guncotton is gelatinized and therefore perfectly safe.

The solution may be prepared cold or warm, application of heat not being necessary.

To apply the composition, the previously-prepared powder is mixed therewith in an ordinary mixing apparatus with or without application of heat. The following proportions are preferable: nitrate-of-ammonia powder, eighty-five per cent.; waterproof composition, fifteen per cent.

The proportion of the composition may vary from five per cent. to thirty per cent.

In addition to the composition a quantity of nitrate of ammonia may be added to the previously-prepared powder—for example, nitrate-of-ammonia powder, seventy-five per cent.; nitrate of ammonia, five per cent.; waterproof composition, twenty per cent.

Instead of adding the composition to a nitrate-of-ammonia powder it may be added to nitrate of ammonia alone, thus producing a nitrate-of-ammonia powder of non-hygroscopic properties—for example, nitrate of ammonia, eighty-two per cent.; waterproof composition, eighteen per cent.

Another example of such powder is as follows: nitrate of ammonia, seventy-five per cent.; waterproof composition, twenty per cent.; nitroglycerin, five per cent. The nitroglycerin may also first be dissolved in the composition and the nitrate of ammonia incorporated with this mixture.

An explosive may also be made of the following composition: nitrate-of-ammonia powder, seventy per cent.; nitrate of ammonia, seven and one-half per cent.; nitroglycerin, seven and one-half per cent.; waterproof composition, fifteen per cent. In this case the nitrate of ammonia may first be mixed with the powder and the nitroglycerin dissolved in the composition and then these two mixtures incorporated, or all four may be incorporated together.

The following is an example of a waterproof composition containing nitroglycerin: mononitrobenzol, sixty-two per cent.; trinitrotoluol, ten per cent.; nitroglycerin, twenty per cent.; nitrocellulose eight per cent.

An explosive may also be made by adding nitrocellulose as well as the composition to nitrate of ammonia or a nitrate-of-ammonia powder.

Both the nitroglycerin and the nitrocellulose if not gelatinized or in solution act as sensitizing ingredients.

Having now fully described my invention, what I claim, and desire to protect by Letters Patent, is—

A composition for waterproofing explosives containing of nitrocellulose one to fifteen per cent., of a normally solid nitro compound less than twenty-five per cent. and of a liquid nitro compound sixty to ninety-five per cent. in which the solid nitro compound and nitrocellulose is dissolved, substantially as described.

In testimony of which invention I have hereunto set my hand, at Philadelphia, on this 10th day of October, 1905.

FIN SPARRE.

Witnesses:
M. M. HAMILTON,
THORNLEY B. WOOD.